United States Patent
Song et al.

(10) Patent No.: US 12,300,866 B2
(45) Date of Patent: May 13, 2025

(54) INTERCONNECTS FOR SOLID OXIDE FUEL CELL COMPRISING NANO-SIZED OXIDE DISPERSION IN FERRITIC STAINLESS STEEL AND MANUFACTURING METHOD THEREOF

(71) Applicant: KOREA INSTITUTE OF ENERGY RESEARCH, Daejeon (KR)

(72) Inventors: Rak Hyun Song, Seoul (KR); Tae Hun Kim, Daejeon (KR); Dong Woo Joh, Sejong-si (KR); Seung Bok Lee, Daejeon (KR); Tak Hyoung Lim, Daejeon (KR); Beom Su Kwon, Daejeon (KR); Amjad Hussain, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 17/563,945

(22) Filed: Dec. 28, 2021

(65) Prior Publication Data
US 2022/0209275 A1 Jun. 30, 2022

(30) Foreign Application Priority Data
Dec. 29, 2020 (KR) .................. 10-2020-0186734

(51) Int. Cl.
  *H01M 8/2432* (2016.01)
  *B22F 3/04* (2006.01)
  *H01M 8/021* (2016.01)

(52) U.S. Cl.
  CPC .......... *H01M 8/2432* (2016.02); *H01M 8/021* (2013.01); *B22F 3/04* (2013.01); *B22F 2301/35* (2013.01); *B22F 2302/25* (2013.01)

(58) Field of Classification Search
  CPC . H01M 8/2432; H01M 8/021; B22F 2301/35; B22F 2302/25
  See application file for complete search history.

(56) References Cited

U.S. PATENT DOCUMENTS

2006/0216570 A1    9/2006    Vyas et al.
2017/0054158 A1    2/2017    Song et al.

FOREIGN PATENT DOCUMENTS

| KR | 20180090463 A | * | 2/2017 |
| KR | 10-1821805 B1 | | 1/2018 |
| KR | 10-2073158 B1 | | 2/2020 |

OTHER PUBLICATIONS

"Nano-Oxide Dispersed Ferritic Stainless Steel for Metallic Interconnects of Solid Oxide Fuel Cells" published by Mehran et al. ECS Transactions, 78 (1) 1575-1582 (2017).*

(Continued)

*Primary Examiner* — Basia A Ridley
*Assistant Examiner* — Heng M. Chan
(74) *Attorney, Agent, or Firm* — Birch, Stewart, Kolasch & Birch, LLP

(57) ABSTRACT

Provided is an interconnect for a solid oxide fuel cell including ferritic stainless steel dispersed with nano-$CeO_2$ and $Nb_2O_5$. The interconnect for the solid oxide fuel cell of the present disclosure includes nano-$CeO_2$ and $Nb_2O_5$ having specific particle sizes in specific contents, thereby suppressing the formation of the insulating layer $SiO_2$ and exhibiting an excellent improvement effect of high-temperature characteristics such as oxidation resistance and sheet resistance.

6 Claims, 7 Drawing Sheets
(4 of 7 Drawing Sheet(s) Filed in Color)

(56) References Cited

OTHER PUBLICATIONS

"Nano-CeO2 and -LaCrO3 dispersed ferritic stainless steels as potential interconnect materials for solid oxide fuel cells" by Mehran et al. Journal of Alloys and Compounds 709 (2017) 453-463.*

Kim et al., "Development of Oxide Dispersed Ferritic Steel as a Solid Oxide Fuel Cell Interconnect," ECS Transactions, vol. 91, No. 1, 2019, pp. 2307-2312. (6 pages total).

* cited by examiner

INTERCONNECTS FOR SOLID OXIDE FUEL CELL COMPRISING NANO-SIZED OXIDE DISPERSION IN FERRITIC STAINLESS STEEL AND MANUFACTURING METHOD THEREOF

CROSS-REFERENCE TO RELATED APPLICATION

This present application claims the benefit of priority to Korean Patent Application No. 10-2020-0186734, entitled "INTERCONNECTS FOR SOLID OXIDE FUEL CELL COMPRISING NANO-SIZED OXIDE DISPERSION IN FERRITIC STAINLESS STEEL AND MANUFACTURING METHOD THEREOF," filed on Dec. 29, 2020, in the Korean Intellectual Property Office, the entire disclosure of which is incorporated herein by reference.

FIELD

The present disclosure relates to an interconnect for a solid oxide fuel cell including nano-sized oxide dispersion ferritic stainless steel and a manufacturing method thereof.

BACKGROUND

A solid oxide fuel cell (SOFC) stack is formed of a layered structure of flat type cells to increase an effective electrode region per unit volume and reduce the internal resistance. In order to electrically connect two adjacent cells in the stack and separate fuel from reactive gases such as air, an interconnect or a connector is used. The material of the interconnect for application as a SOFC connector should have high conductivity and a thermal expansion coefficient (TEC) close to that of the other components of the cell. In addition, since the operating temperature of the SOFC is very high, the material of the connector requires high corrosion resistance in anode and cathode environments. Due to recent improvements to reduce the operating temperature of the SOFC to below 800° C., many research groups have conducted a lot of research on metallic connector materials. Ferritic steel-based metal connectors have advantages of having high electrical conductivity and thermal conductivity, being easily processed, and having a lower price than ceramic materials, but have still problems of increasing the resistance due to the growth of an oxide layer and generation of interfacial defects between metal/oxide, and the like in the long-term exposure to a high-temperature oxidizing atmosphere of the SOFC and deteriorating the stack caused by a cathode poisoning phenomenon due to volatilization of chromium species ($CrO_3$ or $CrO_2(OH)_2$) generated from a chromia oxide layer.

In order to improve the high-temperature characteristics and conductivity of the metallic connector, various studies have been performed to add and disperse rare earth oxides/reactive elements such as $CeO_2$, $LaCrO_3$, $La_2O_3$, $Y_2O_3$, etc. as well as to add various elements such as Mo, Ti, Nb, Co, etc. in the alloy. Among them, Nb is added to stainless steel to form a secondary phase at grains and grain boundaries, thereby reducing the diffusion of Fe, Mn, and Cr ions in the metals and improving oxidation resistance by controlling an oxidation behavior. Trace Si in the stainless steel forms a silica ($SiO_2$) insulating layer below the oxide to reduce the electric conductivity, and at this time, Nb captures Si in the steel and forms a Laves phase ($Fe_2Nb$), thereby reducing the formation of the silica insulating layer. In addition, it is reported that a corrosion resistance improvement effect is exhibited by forming a compound (Nb carbide, Nb nitride, etc.) containing Nb on the metal surface during corrosion.

A metal connector manufacturing process may be largely divided into a casting process or a powder metallurgy process. The casting process manufactures an alloy by melting a metal at a high temperature, such as vacuum induction melting (VIM) or arc-melting. The method of manufacturing the alloy by melting the metal has advantages such as composition control, degassing, and the like of the alloy, but since the temperature needs to reach a melting point, there are disadvantages of having limitations in material implications and high cost. However, in the case of the powder metallurgy process, since there is an advantage that material implications are relatively free and the cost is low, the powder metallurgy process is widely applied to the manufacturing of metallic connectors. In many studies, when Nb is added in the preceding processes, there are cases in which Nb is added in the form of an oxide, but in general, Nb is added in the form of a pure metal to improve high-temperature oxidation characteristics, conductivity, and corrosion resistance. In the case of the powder metallurgy process, the shape is sintered and fabricated by adjusting a gas atmosphere in a process of mixing and then sintering metal powder at a desired composition, but for ease of powder mixing and cost reduction, it is easier to apply a metal oxide form than using a pure metal form.

Accordingly, the present inventors have made efforts to develop a ferritic steel-based nano-oxide dispersion alloy to be used as a SOFC connector, and then manufactured SUS430 steel dispersed with nano-$CeO_2$ and $Nb_2O_5$ by adding various contents of nano-$CeO_2$ powder and $Nb_2O_5$ powder to SUS430 powder using a high-energy ball milling process. The present inventors confirmed that these nano-oxides block cations (Mn, Cr, etc.) from being diffused in a substrate at an oxide scale to delay the oxide formation and form a laves phase to prevent the formation of an insulating layer, thereby exhibiting the same effect as the metallic connector added in the form of Nb metal, such as reducing oxide scale growth, Cr evaporation, and deterioration of electrical properties of the metallic connector for a long operating time. The present inventors found that the manufactured alloy had stability in a long-term isothermal oxidation test in an air atmosphere at 800° C. to be usefully used as a connector for a SOFC, and then completed the present disclosure.

SUMMARY

An object of the present disclosure is to solve the overall problems that have been pointed out in conventional metallic connectors used for a solid oxide fuel cell and to provide an interconnect for a solid oxide fuel cell including a ferritic steel-based nano oxide dispersion alloy, that is, ferritic stainless steel dispersed with nano-$CeO_2$ and $Nb_2O_5$ and a manufacturing method thereof.

An exemplary embodiment of the present disclosure provides an interconnect for a solid oxide fuel cell including ferritic stainless steel dispersed with nano-$CeO_2$ and $Nb_2O_5$.

Another exemplary embodiment of the present disclosure provides a manufacturing method of an interconnect for a solid oxide fuel cell including the steps of obtaining alloy powder slurry by mixing nano-$CeO_2$ powder and $Nb_2O_5$ powder with ferritic stainless steel powder and then using a high energy ball milling (HEBM) process of the mixed powder; drying the slurry; grinding and sieving the dried mixed powder; pelletizing the ground and sieved powder by a uni-axial press; obtaining a molded body by cold-isostatic pressing the pellets; and obtaining an alloy-sintered body by sintering the molded body.

The interconnect of the present disclosure includes nano-$CeO_2$ and $Nb_2O_5$ having particular particle sizes at specific contents to suppress the formation of an insulating layer $SiO_2$. In particular, Nb and Fe form a laves phase, and the laves phase is located at a grain boundary to block the external diffusion of cations (i.e., Cr, Mn, etc.) in the substrate, thereby controlling the oxidation rate, and consequently reducing the oxide scale.

In other words, Nb and Fe reduce oxide scale growth, Cr evaporation, and deterioration of electrical properties of metal connectors during a long operating time, and the manufactured alloy has stability in a long-term isothermal oxidation test in an air atmosphere at 800° C. to be usefully used as an interconnect for a SOFC.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Hereinafter, various exemplary embodiments of the present disclosure will be described with reference to the accompanying drawings. The exemplary embodiments and terms used therein are not intended to limit the technology described in the present disclosure to a specific embodiment, and it should be understood to include various modifications, equivalents, and/or substitutes for the exemplary embodiment.

An interconnect for a solid oxide fuel cell according to various exemplary embodiments of the present disclosure may include ferritic stainless steel in which nano-$CeO_2$ and $Nb_2O_5$ are dispersed. At this time, the content of nano-$CeO_2$ may be 0.01 to 3.5 wt. %. Preferably, the content of nano-$CeO_2$ may be 1 to 3 wt. %. The particle size of nano-$CeO_2$ may be 20 nm or less.

The content of $Nb_2O_5$ may be 0.1 to 1.5 wt. %. Preferably, the content of $Nb_2O_5$ may be 0.5 to 1 wt. %. The particle size of $Nb_2O_5$ may be 45 µm or less.

The interconnect of the present disclosure includes nano-$CeO_2$ and $Nb_2O_5$ having particular particle sizes at specific contents to suppress the formation of an insulating layer $SiO_2$. In addition, the cation diffusion rate may be appropriately controlled, and the proper composition of Nb element may accelerate pore diffusion in a sintering process to help a substrate to be densely sintered. In addition, the growth rate of oxide may be reduced by controlling the diffusion rate of cations by forming a laves phase ($Fe_2Nb$) that blocks the diffusion path of cations.

Figure 1:
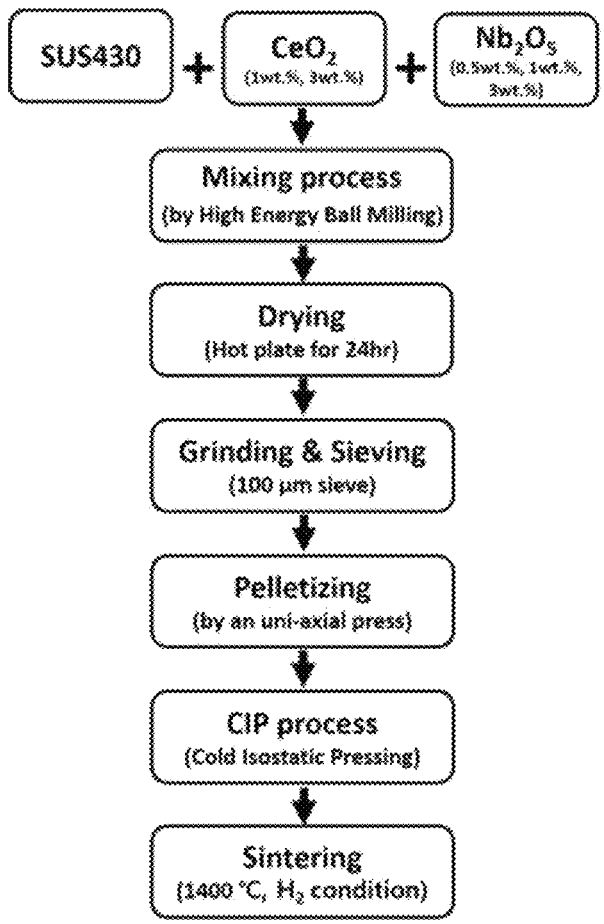
FIG. 1 is a process flowchart of a manufacturing method of an interconnect for a solid oxide fuel cell of the present disclosure.

Hereinafter, a manufacturing method of an interconnect for a solid oxide fuel cell will be described with reference to FIG. 1.

A manufacturing method of an interconnect for a solid oxide fuel cell according to various exemplary embodiments of the present disclosure may include the steps of obtaining alloy powder slurry by mixing nano-$CeO_2$ powder and $Nb_2O_5$ powder with ferritic stainless steel powder and then using a high energy ball milling (HEBM) process of the mixed powder; drying the slurry; grinding and sieving the dried mixed powder; pelletizing the ground and sieved powder by a uni-axial press; obtaining a molded body by cold-isostatic pressing the pellets; and obtaining an alloy-sintered body by sintering the molded body.

Specifically, in the step of obtaining the alloy powder slurry, the HEBM may be performed after mixing nano-$CeO_2$ powder and $Nb_2O_5$ powder with ferritic stainless steel powder. At this time, nano-$CeO_2$ may be included in 0.01 to 3.5 wt. % based on the total weight of the mixed powder. In addition, $Nb_2O_5$ may be included in 0.1 to 1.5 wt. % of the total weight of the mixed powder. On the other hand, the particle size of the ferritic stainless steel powder may be 10 to 50 μm. At this time, the powder may be dispersed through HEBM by adding a solvent and additives. The HEBM may be performed at a rate of 200 rpm to 300 rpm. Accordingly, it is possible to improve the dispersibility between the stainless steel powder and the added oxide.

Next, in the step of drying the slurry, the slurry may be dried at a temperature of 110° C. to 130° C. using a hot plate while stirring with a stirrer.

Next, in the pulverizing and sieving step, the dried mixed powder may be ground with a mortar and sieved using a 50 to 150 μm-mesh.

Next, in the step of manufacturing the pellets, the pellets may be uniaxially pressed at a pressure of 500 MPa to 700 MPa using a stainless steel mold.

Next, in the step of obtaining the molded body, cold isostatic pressing (CIP) may be performed at 100 MPa to 300 MPa.

Next, in the step of obtaining the alloy-sintered body, the sintering may be performed for 5 to 15 hours in a hydrogen atmosphere at 1200 to 1500° C. Preferably, the sintering may be performed for 10 hours in a hydrogen atmosphere at about 1400° C.

The manufacturing method of the present disclosure is more economical than existing high-cost casting and rolling manufacturing processes.

Meanwhile, the present disclosure provides a solid oxide fuel cell including the above-described interconnect for the solid oxide fuel cell.

In the present disclosure, the solid oxide fuel cell may be manufactured using a conventional method known in various documents in the art. In addition, the solid oxide fuel cell may be applied to various structures such as a tubular stack, a flat tubular stack, a planar type stack, and the like.

Hereinafter, the present disclosure will be described in more detail through Examples and Experimental Examples.

These Preparation Example, Examples, and Experimental Examples are only to describe the present disclosure in more detail, and it will be apparent to those skilled in the art that the scope of the present disclosure is not limited by these Examples and Experimental Examples in accordance with the gist of the present disclosure.

<Example 1>Manufacture of Interconnects

Commercially available nano-$CeO_2$ (Sigma-Aldrich, USA, particle size<20 nm) and $Nb_2O_5$ (Alfa-aesar, Canada, particle size<45 μm) and commercial stainless steel powder (SUS430; Metal player, Korea, particle size of 10 to 50 μm) were prepared. The composition of SUS430 used is shown in Table 1 below.

TABLE 1

| Steel alloy | Element Composition (wt. %) | | | | | | |
|---|---|---|---|---|---|---|---|
| | Fe | Cr | O | S | N | C | Si | Mn |
| SUS430 | Balance | 16.85 | 0.054 | 0.003 | 0.13 | 0.02 | 0.5 | 0.62 |

In a stainless steel container, nano-$CeO_2$ powder (1, 3 wt. %) and $Nb_2O_5$ powder (0.5, 1, 2 wt. %) were added to SUS430 powder containing various-sized zirconia balls and isopropyl alcohol (99.9%, Duksan Co., Korea) as a solvent. The powder was ball-milled at 250 rpm for 24 hours using a high energy ball milling (HEBM) process to obtain uniformly mixed alloy powder. Thereafter, the mixed powder slurry was completely dried using a hot plate at 120° C. while stirring with a mechanical stirrer. Finally, the dried mixed powder was ground using a mortar and sieved using a 100 μm mesh. Pellets having sizes of 13 mm (L)×6 mm (W)×2 mm (t) were fabricated using a stainless steel mold, subjected to uniaxial pressing at a pressure of 600 MPa, and then subjected to cold isostatic pressing (CIP) at 200 MPa to obtain high-density green pellets. Finally, the green pellets were sintered at 1400° C. for 10 hours in a reducing atmosphere (dry $H_2$). After sintering, densely sintered specimens were prepared for subsequent experiments.

<Experimental Example 1>Measurement of Density

After sintering in a reducing atmosphere ($H_2$) and a high temperature (1400° C.), the actual density and relative density of the sintered pellets were measured.

The actual density was calculated using the Archimedes' principle. The relative density was calculated through the theoretical density of a SUS alloy.

To determine the density of the sintered specimens, the weights were measured using a scale and a density measuring kit (ML204/01, METTLER TOLEDO Co.).

Figure 2:
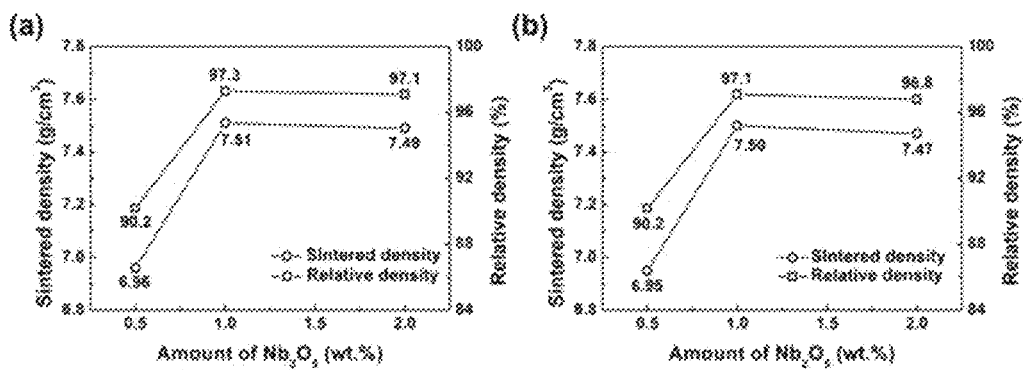
FIG. 2 in part (a) illustrates sintered density and relative density of a specimen added with 1 wt. % of $CeO_2$, and FIG. 2 in part (b) illustrates sintered density and relative density of a specimen added with 3 wt. % of $CeO_2$.

After sintering, the sintered density and the relative density of the specimen according to the added content of $Nb_2O_5$ are shown in FIG. 2. In Experimental Example, the total amount of added oxide was adjusted so as not to be more than 5 wt. %. FIG. 2 in part (a) illustrates sintered density and relative density of a specimen added with 1 wt. % of $CeO_2$, and FIG. 2 in part (b) illustrates sintered density and relative density of a specimen added with 3 wt. % of $CeO_2$.

Referring to part (a) of FIG. 2, the relative density was higher than 90%, and when $Nb_2O_5$ was increased from 0.5 wt. % to 1 wt. %, the sintered density and the relative density were rapidly increased. The sintered density and the relative density were slightly decreased or almost similar when the addition amount of $Nb_2O_5$ was increased from 1 wt. % to 2 wt. %. On the other hand, even when the amount of $CeO_2$ was increased from 1 wt. % to 3 wt. %, the relative density was not changed.

<Experimental Example 2>Microstructure Analysis

Figure 3:
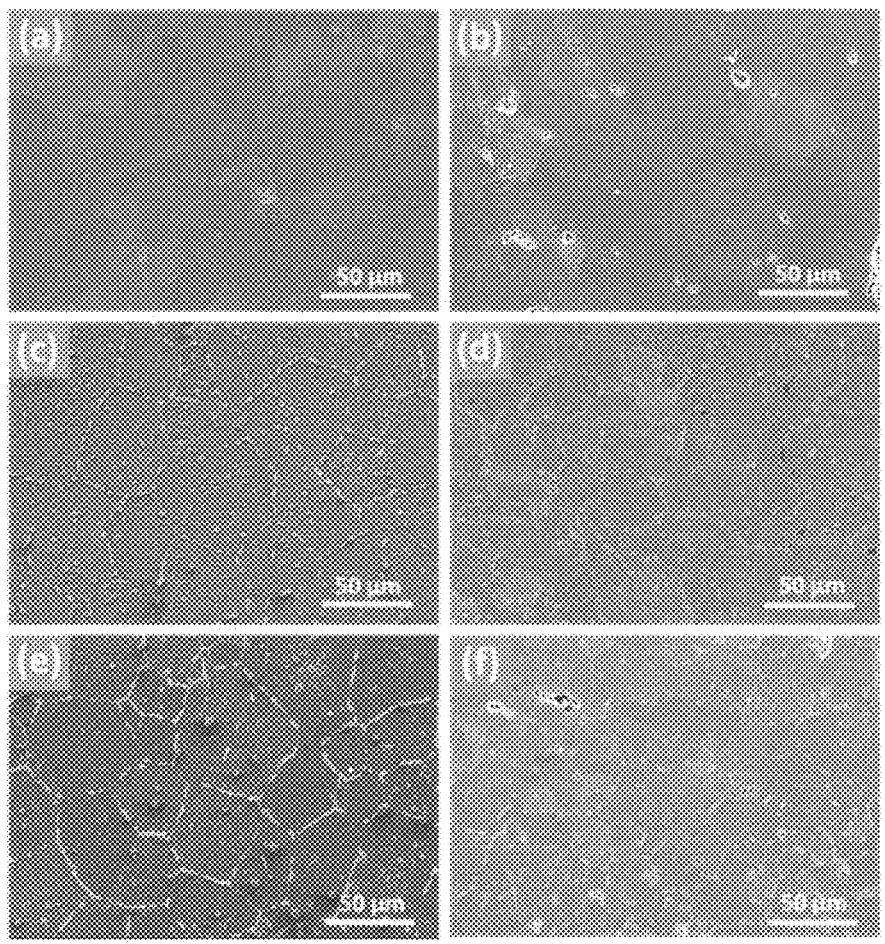
FIG. 3 shows surface SEM images after etching (a) SUS430+1 wt. % $CeO_2$+0.5 wt. % $Nb_2O_5$, (b) SUS430+3 wt. % $CeO_2$+0.5 wt. % $Nb_2O_5$, (c) SUS430+1 wt. % $CeO_2$+1 wt. % $Nb_2O_5$, (d) SUS430+3 wt. % $CeO_2$+1 wt. % $Nb_2O_5$, (e) SUS430+1 wt. % $CeO_2$+2 wt. % $Nb_2O_5$, and (f) SUS430+3 wt. % $CeO_2$+2 wt. % $Nb_2O_5$, respectively, and (g) illustrates an EDS result of SUS430+3 wt. % $CeO_2$+1 wt. % $Nb_2O_5$.
Figure 3:
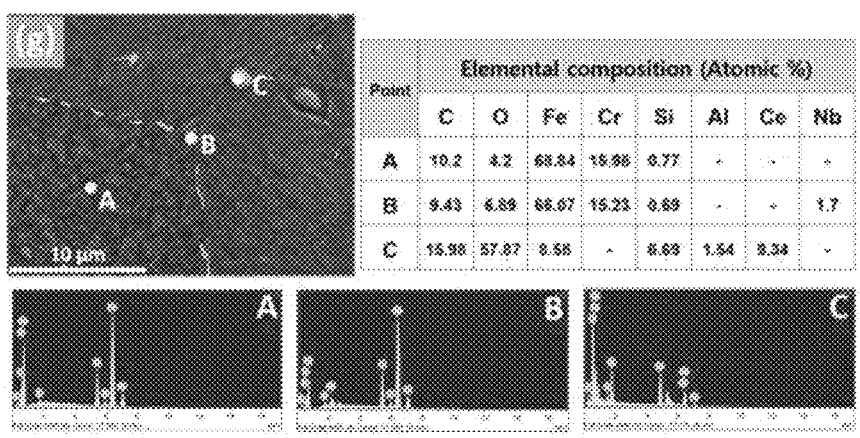

FIG. 3 shows surface SEM images after etching (a) SUS430+1 wt. % $CeO_2$+0.5 wt. % $Nb_2O_5$, (b) SUS430+3 wt. % $CeO_2$+0.5 wt. % $Nb_2O_5$, (c) SUS430+1 wt. % $CeO_2$+1 wt. % $Nb_2O_5$, (d) SUS430+3 wt. % $CeO_2$+1 wt. % $Nb_2O_5$, (e) SUS430+1 wt. % $CeO_2$+2 wt. % $Nb_2O_5$, and (f) SUS430+3 wt. % $CeO_2$+2 wt. % $Nb_2O_5$, respectively, and (g) illustrates an EDS result of SUS430+3 wt. % $CeO_2$+1 wt. % $Nb_2O_5$.

Referring to parts (a)-(f) of FIG. 3, niobium (Nb) and cerium (Ce) oxides were distributed at grain boundaries in the specimens of each composition. In this case, a laves phase ($Fe_2Nb$) containing niobium may be identified through a plate-shaped white line, and $CeO_2$ may be identified through some other particles. Also, referring to parts (a), (c) and (e) of FIG. 3, as the amount of $Nb_2O_5$ was increased from 0.5 wt. % to 3 wt. %, more white plate-shaped laves phases appeared along the grain boundaries.

The formed precipitate (e.g., Laves phase, $Fe_2Nb$) was formed at the interface and grains, but were mainly better formed at the interface. Because the precipitate may stabilize the grain boundaries, the particle size precipitated along the αFe grain boundary may not change during high-temperature oxidation.

Part (g) of FIG. illustrates an EDS result of a sintered specimen of SUS430+3 wt. % CeO$_2$+1 wt. % Nb$_2$O$_5$. At Point B, a plate-like precipitate showed 9.43 at % C, 6.89 at % O, 66.07 at % Fe, 15.23 at % Cr, 0.69 at % Si and 1.7 at % Nb. According to this EDS result, the precipitate formed at the grain boundary was estimated as a Fe$_2$Nb-type Laves phase, and in Point C, the existence of Ce element may be confirmed through the elemental content of 15.98 at % C, 57.87 at % O, 8.58 at % Fe, 6.69 at % Si, 1.54 at % Al and 9.34 at % Ce. In Points B and C, the contents of other background elements (e.g., C, Fe, Cr, Si and Al) except for Nb and Ce elements were caused by the substrate components by irradiating X-rays with a specific thickness.

Through these SEM and EDS analyses, it can be confirmed that the added oxides were well dispersed at the grain boundaries and most of the sintered specimens.

<Experimental Example 3>Thermal Expansion Coefficient (TEC) Analysis

A cylindrical specimen with a diameter of 6 mm and a length of 10 mm was used for TEC analysis. The average thermal expansion between 30° C. and 800° C. was measured in an oxidizing atmosphere.

Figure 4:
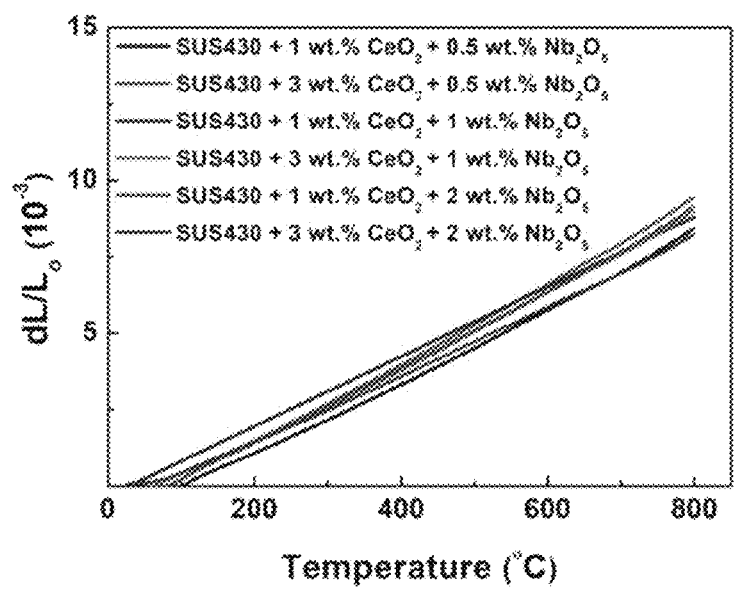
FIG. 4 is a graph showing ratios of length change of specimens with different compositions over time.

FIG. 4 is a graph showing ratios of length change of specimens with different compositions over time, and TEC values of all the compositions were 10 to 13×10$^{-6}$·K$^{-1}$.

Figure 5:
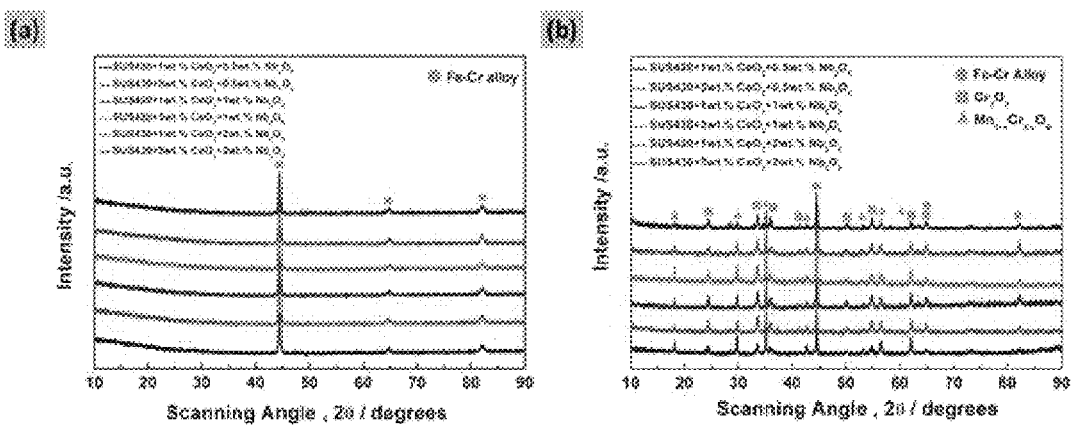
FIG. 5 illustrates XRD analysis for various sintering specimens before and after an oxidation test at 800° C. for 1000 hours.

<Experimental Example 4>Oxide Scale Characteristics after ASR Test for 1000 Hours FIG. 5 illustrates XRD analysis for various sintering specimens before and after an oxidation test at 800° C. for 1000 hours. Referring to part (a) of FIG. 5, in XRD patterns of specimens having various compositions before oxidation, since the amount of metal oxide dispersed in SUS430 was less than 5 wt %, the peak of the added metal oxide except for a Fe—Cr alloy peak was not detected. This may be because a small amount of oxidizing additive was accumulated at the grain boundaries. On the other hand, in oxide-scale XRD patterns formed on specimens of all compositions after oxidation, three types of phases such as an Fe—Cr alloy structure, Cr$_2$O$_3$ and an Mn$_{1+x}$Cr$_{2-x}$O$_4$ spinel structure were confirmed. In the sintering process in a reducing atmosphere, niobium pentoxide (Nb$_2$O$_5$) was sequentially reduced to niobium dioxide (NbO$_2$), niobium monoxide (NbO) and niobium metal (Nb) through a process of the following Formulas (1), (2), and (3). In addition, the laves phase was formed under the reaction of Nb and Fe under a condition of 900° C. to 1523° C. The XRD peak of Fe$_2$Nb may also not be detected for the reasons described above.

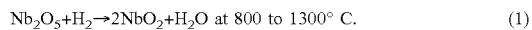

$$Nb_2O_5 + H_2 \rightarrow 2NbO_2 + H_2O \text{ at 800 to 1300° C.} \quad (1)$$

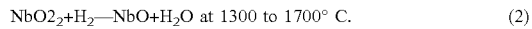

$$NbO_2 + H_2 \rightarrow NbO + H_2O \text{ at 1300 to 1700° C.} \quad (2)$$

$$NbO + H_2 \rightarrow Nb + H_2O \quad (3)$$

<Experimental Example 5>STEM Image and EDS Analysis

Figure 6:
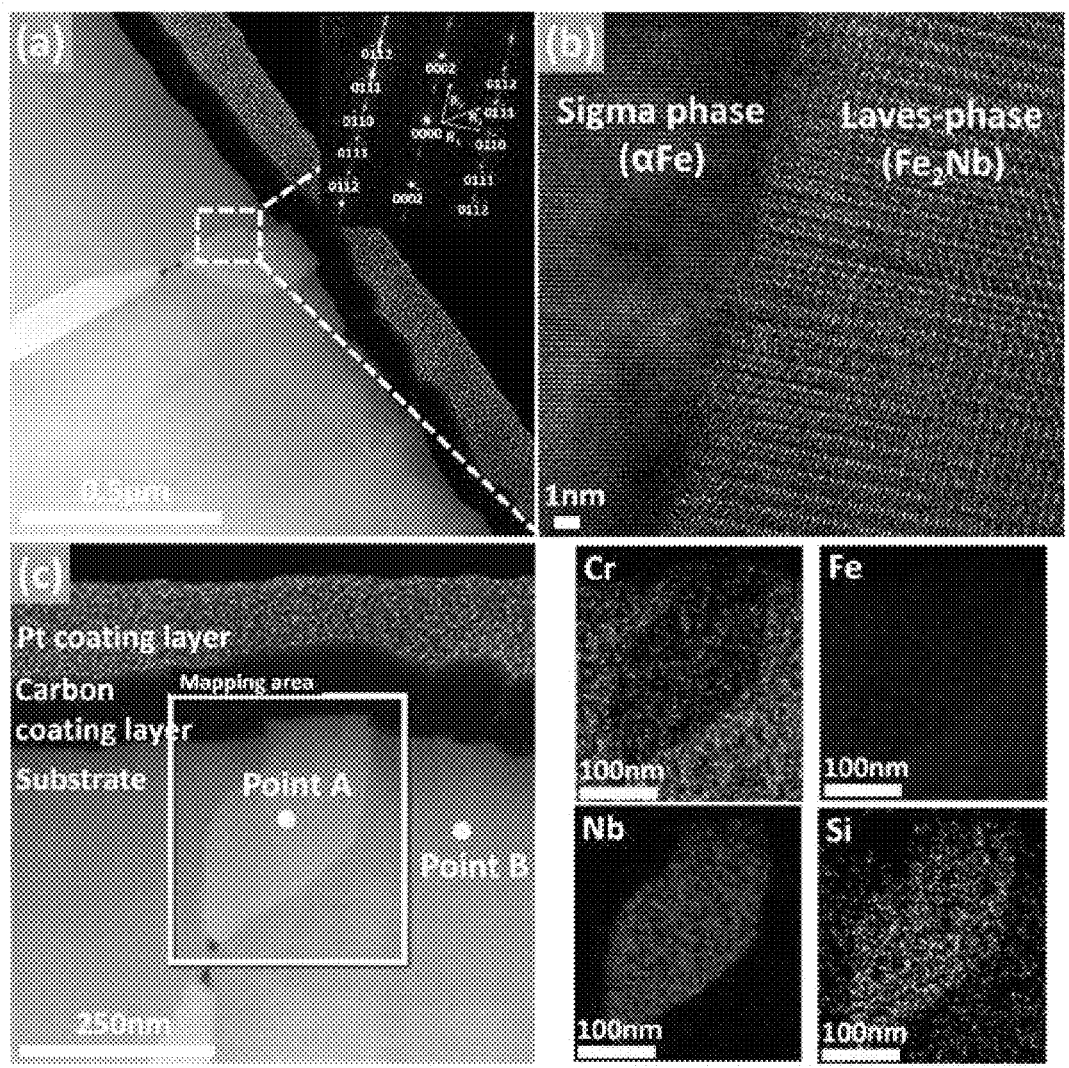
FIG. 6 shows STEM images and EDS analysis results of cross-sections of precipitated particles estimated as laves phases on the surface of SUS430+3 wt. % $CeO_2$+1 wt. % $Nb_2O_5$.

FIG. 6 shows STEM images and EDS analysis results of cross-sections of precipitated particles estimated as laves phases on the surface of SUS430+3 wt. % CeO$_2$+1 wt. % Nb$_2$O$_5$. FIG. 6 in part (a) shows that particles estimated as laves phases were mainly formed in a plate shape with a thickness range of 75 nm to 75 nm or more. Also, other layers such as a SiO$_2$ layer were not observed. A crystallographic orientation of the laves phase-estimated particle portion was determined using TEM selected area electron diffraction (SAED) analysis, as illustrated in part (a) of FIG. 6. The crystallographic orientation exhibits a hexagonal closed packed (hcp) structure in a beam direction. This structure is the same as a C14 laves phase structure formed on ferritic stainless steel.

Referring to part (c) of FIG. 6, in the EDS mapping result, the particles were confirmed as particles containing Nb and Si elements in a larger amount than that of the surrounding area. The Si element was distributed outside the particle as well as the particle, but as described above, no layer was formed.

Table 2 below shows the composition of each element at Points A and B of part (c) of FIG. 6.

TABLE 2

| | Elemental Composition (at. %) | | | | | |
|---|---|---|---|---|---|---|
| | Fe | Cr | O | Si | Nb | Total |
| Point A | 39.2 | 6.4 | 29.8 | 8.8 | 15.8 | 100 |
| Point B | 81.5 | 18.6 | — | — | | 100 |

In Point A in the particle, through the element content ratio, Cr and Si elements were identified as a partially solid solution (Fe, Cr)$_2$(Nb, Si) structure in a laves phase of the Fe$_2$Nb structure. In addition, in Point B as the substrate portion, Fe and Cr elements were detected as a main component. According to previous studies, in a substrate without Nb and Ti elements, the SiO$_2$ layer continuously grows at an interface between the oxide and the substrate, whereas when Nb and Ti elements exist in the substrate, the laves phase is formed to hinder the growth of the SiO$_2$ layer. Accordingly, it can be seen that the laves phase may suppress the formation of the SiO$_2$ layer, which is an insulating layer that affects the improvement of conductivity.

Figure 7:
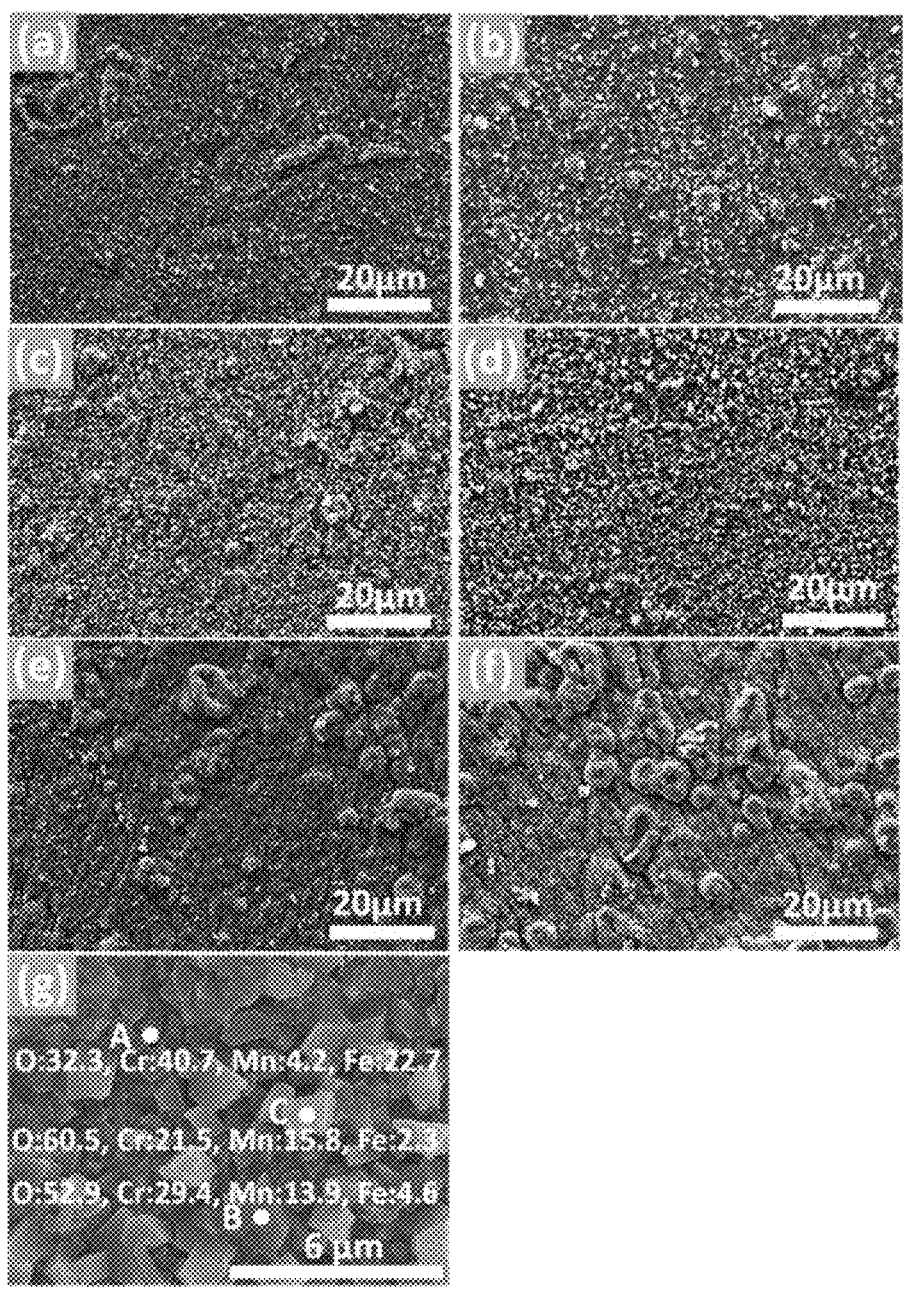
FIG. 7 shows surface SEM images after oxidation for 1000 hours of (a) SUS430+1 wt. % $CeO_2$+0.5 wt. % $Nb_2O_5$, (b) SUS430+3 wt. % $CeO_2$+0.5 wt. % $Nb_2O_5$, (c) SUS430+1 wt. % $CeO_2$+1 wt. % $Nb_2O_5$, (d) SUS430+3 wt. % $CeO_2$+1 wt. % $Nb_2O_5$, (e) SUS430+1 wt. % $CeO_2$+2 wt. % $Nb_2O_5$, and (f) SUS430+3 wt. % $CeO_2$+2 wt. % $Nb_2O_5$, respectively, and (g) illustrates an EDS result of SUS430+3 wt. % $CeO_2$+1 wt. % $Nb_2O_5$.

FIG. 7 shows surface SEM images after oxidation for 1000 hours of (a) SUS430+1 wt. % CeO$_2$+0.5 wt. % Nb$_2$O$_5$, (b) SUS430+3 wt. % CeO$_2$+0.5 wt. % Nb$_2$O$_5$, (c) SUS430+1 wt. % CeO$_2$+1 wt. % Nb$_2$O$_5$, (d) SUS430+3 wt. % CeO$_2$+1 wt. % Nb$_2$O$_5$, (e) SUS430+1 wt. % CeO$_2$+2 wt. % Nb$_2$O$_5$, and (f) SUS430+3 wt. % CeO$_2$+2 wt. % Nb$_2$O$_5$, respectively, and (g) illustrates an EDS result of SUS430+3 wt. % CeO$_2$+1 wt. % Nb$_2$O$_5$. Oxide scales were formed entirely on the surfaces of all specimens, and polygonal crystalline particles, and tetrahedral shaped and corundum particles were observed. Generally, oxide scales formed from oxidized stainless steel with chromium and manganese elements consist of Cr$_2$O$_3$ and Mn—Cr spinel. The Mn—Cr spinel is formed on the top of Cr$_2$O$_3$ of the substrate. The Mn—Cr spinel has polygonal crystal particles, while Cr$_2$O$_3$ has corundum-shaped particles. Polygonal crystal phases estimated as the Mn—Cr spinel were confirmed on the oxide scales formed on the specimens of all compositions, and referring to part (g) of FIG. 7, the Mn—Cr spinel phases having various compositions were confirmed through EDS point analysis. The Mn—Cr spinel oxide formed on the substrate surface served as an effective barrier to Cr cation-external transport and improved the surface stability. Referring to parts (e) and (f) of FIG. 7, aggregated oxides were observed in a composition added with 2 wt. % of $Nb_2O_5$. When a large amount of $Nb_2O_5$ is added, the residual Nb element is diffused to the outside after the layer is formed on the substrate, thereby promoting the oxide formation. In particular, referring to part (f) of FIG. 7, the composition of SUS430+3 wt. % $CeO_2$+2 wt. % $Nb_2O_5$ produced agglomerated oxides in many parts. This is because more residual elements are diffused outward by adding a large amount of $Nb_2O_5$ to the composition. On the other hand, referring to part (d) of FIG. 7, in the case of SUS430+$CeO_2$ 3 wt. %+$Nb_2O_5$ 1 wt. %, it was confirmed that the aggregated oxide was small compared to other specimens and Mn—Cr spinel crystals were evenly distributed. That is, the addition of an appropriate amount of oxide adequately controlled a cation diffusion rate. The proper composition of the Nb element accelerates the pore diffusion in the sintering process and helps the substrate to be densely sintered. In addition, the growth rate of oxide may be reduced by controlling the diffusion rate of cations by forming a laves phase that blocks the diffusion path of cations.

As described above, the oxide scale forms $Cr_2O_3$ with the Mn—Cr spinel on the oxidized substrate. A spinel with higher conductivity helps to mitigate the oxidation rate by interfering with external chromium ion diffusion and internal movement of oxide ions.

Electrical conductivity is affected by various factors such as adhesion between the oxide scale and the substrate, the thickness of the oxide scale, and a type of oxide scale (e.g., $Cr_2O_3$, $(Mn, Cr)_3O_4$) as the exposure time is increased in an oxidized atmosphere. The factors affecting conductivity were confirmed using SEM and EDS analyses.

Figure 8:
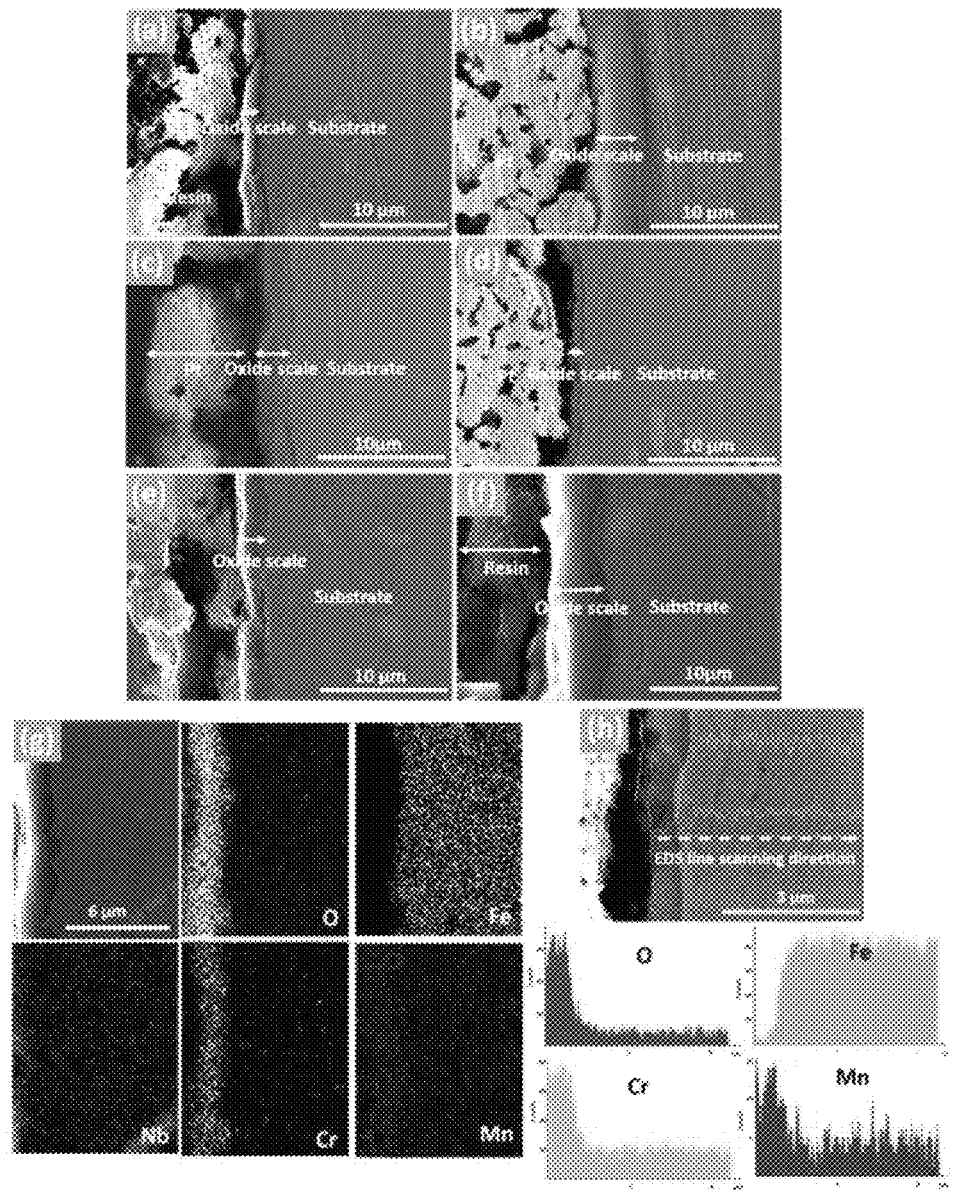
FIG. 8 shows cross-sectional SEM images after long-term test of (a) SUS430+1 wt. % $CeO_2$+0.5 wt. % $Nb_2O_5$, (b) SUS430+3 wt. % $CeO_2$+0.5 wt. % $Nb_2O_5$, (c) SUS430+1 wt. % $CeO_2$+1 wt. % $Nb_2O_5$, (d) SUS430+3 wt. % $CeO_2$+1 wt. % $Nb_2O_5$, (e) SUS430+1 wt. % $CeO_2$+2 wt. % $Nb_2O_5$, and (f) SUS430+3 wt. % $CeO_2$+2 wt. % $Nb_2O_5$, respectively, (g) shows an EDS mapping image of SUS430+3 wt. % $CeO_2$+1 wt. % $Nb_2O_5$, and an EDS line scan image, and (h) shows a line scan image.

FIG. 8 shows cross-sectional SEM images after long-term test of (a) SUS430+1 wt. % $CeO_2$+0.5 wt. % $Nb_2O_5$, (b) SUS430+3 wt. % $CeO_2$+0.5 wt. % $Nb_2O_5$, (c) SUS430+1 wt. % $CeO_2$+1 wt. % $Nb_2O_5$, (d) SUS430+3 wt. % $CeO_2$+1 wt. % $Nb_2O_5$, (e) SUS430+1 wt. % $CeO_2$+2 wt. % $Nb_2O_5$, and (f) SUS430+3 wt. % $CeO_2$+2 wt. % $Nb_2O_5$, respectively, and (g) shows an EDS mapping image of SUS430+3 wt. % $CeO_2$+1 wt. % $Nb_2O_5$, and an EDS line scan image.

Except for the composition of SUS430+1 wt. % $CeO_2$+2 wt. % $Nb_2O_5$, it was confirmed that the adhesion between the substrate and the oxide was entirely good without peeling, and the thickness of the oxide was changed according to the composition. Average thicknesses of oxide scales of SUS430+1 wt. % $CeO_2$+0.5 wt. % $Nb_2O_5$, SUS430+3 wt. % $CeO_2$+0.5 wt. % $Nb_2O_5$, SUS430+1 wt. % $CeO_2$+1 wt. % $Nb_2O_5$, SUS430+3 wt. % $CeO_2$+1 wt. % $Nb_2O_5$, SUS430+1 wt. % $CeO_2$+2 wt. % $Nb_2O_5$ and SUS430+3 wt. % $CeO_2$+2 wt. % $Nb_2O_5$ were 1.8, 2.7, 2.5, 1.3, 2.5 and 3.5 μm, respectively.

A laves phase such as $(Cr, Fe)_2(Nb, Si)$ is formed after a laves-forming alloy is oxidized at a high temperature. In addition, the formed laves phase is located at the grain boundary to block the external diffusion of cations (i.e., Cr, Mn, etc.) in the substrate, thereby controlling the oxidation rate.

Based on this mechanism, an alloy forming the laves phase has a lower cation diffusion rate than that of conventional alloys without rare earth elements or elements forming the laves phase, resulting in reduced oxide scale. Referring to FIG. 8 in parts (b) and (d), when the amount of $Nb_2O_5$ added to the specimen containing 3 wt. % $CeO_2$ was increased from 0.5 wt. % to 1 wt. %, a decreased thickness in the oxide scale was confirmed. However, the thicknesses of the oxide scales except for SUS430+3 wt. % $CeO_2$+1 wt. % $Nb_2O_5$ were entirely increased. It was found that as the Nb content of the alloy increased, the thickness of the oxide scale was also increased as Nb was diffused on the oxide surface where the oxide scale was formed. That is, it was shown that in the composition added with 2 wt. % $Nb_2O_5$, the remaining Nb after forming the laves phase was diffused out of the oxide to form more oxides. In addition, a general alloy containing an Si element forms an insulating layer $SiO_2$ at the interface between the oxide scale and the substrate at a high temperature, and the formed insulating layer greatly increases the electrical resistance. However, an alloy containing an Nb or Ti element may form a laves-phase precipitate to suppress the formation of a continuous insulating layer. Referring to parts (a) to (f) of FIG. 8, no layer was observed at the interface between the oxide and the substrate.

Parts (g) and (h) of FIG. 8 show EDS mapping and line scan images after oxidation of SUS430+3 wt. % $CeO_2$+1 wt. % $Nb_2O_5$ for 1000 hours. Fe, Cr, and Mn elements, which are components of SUS430, are generally distributed on the substrate, and an Nb element, which is an additional element, is also well distributed. It can be seen that Nb, which is an additive element, is not only entirely distributed but also partially aggregated. In addition, Nb is also observed on the oxide surface. The aggregated portion on the substrate is regarded as the laves-phase precipitate, and the concentrated portion on the oxide scale surface is an oxide with an Nb element. As described above, after the laves phase is formed, the residual Nb is diffused out of the oxide to form an oxide. The O and Cr elements are mainly distributed in the oxide scale portion, and the Mn element is also concentrated in the oxide scale portion.

Referring to part (h) of FIG. 8, it was shown that O, Cr, and Mn were mainly observed in the oxide scale in the EDS line scanning analysis. The Cr and Mn contents of the alloy were diffused toward the oxide scale to form an Mn—Cr spinel and $Cr_2O_3$. This can be confirmed in the XRD pattern of FIG. 5 above. The delay of the oxide formation due to the Mn—Cr spinel formation caused the decreased ASR value.

<Experimental Example 6>Long-term Area Specific Resistance (ASR) Test

Figure 9:
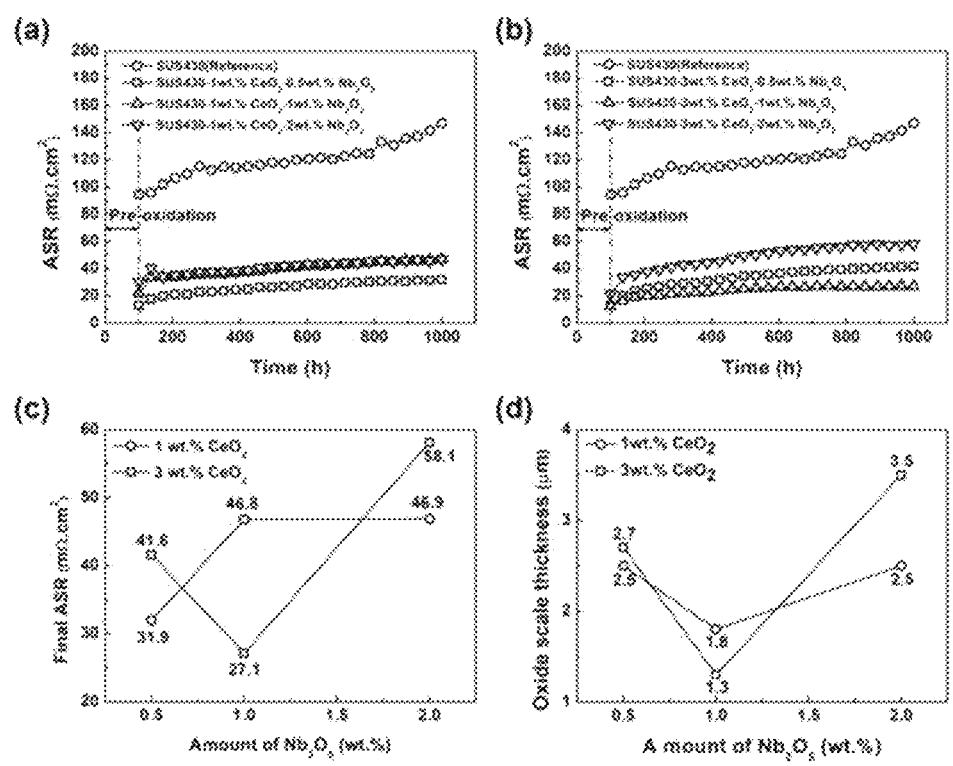
FIG. 9 shows long-term ASR graphs of SUS430 and specimens containing various compositions in an oxidizing atmosphere at 800° C. in parts (a) and (b), and shows graphs of final ASR values (ASR values after 1000 hours of oxidation) and oxide scale thicknesses (thicknesses measured after 1000 hours of oxidation) of specimens with different added metal oxide contents in parts (c) and (d).

FIG. 9 in parts (a) and (b) shows long-term ASR graphs of SUS430 and specimens containing various compositions in an oxidizing atmosphere at 800° C. Area specific resistance (ASR) is an electron resistance method of the oxide scale formed on the substrate surface. The overall ASR values of the specimens added with oxides ($CeO_2$ and $Nb_2O_5$) were lower than those of SUS430. The initial ASR of SUS430 was 94.3 $m\Omega.cm^2$, which was significantly higher than the ASR values of compositions with various metal oxide contents. In addition, the ASR value steadily increased over time with an increase rate of 52.3 $m\Omega.cm^2$, and after oxidation for 1000 hours, the final ASR value was 146.9 $m\Omega.cm^2$. On the other hand, in the case of the specimen in which the additive metal oxide was dispersed, the initial ASR value was improved compared to that of SUS430, and the ASR increase rates of various compositions (SUS430+1 wt. % $CeO_2$+0.5 wt. % $Nb_2O_5$, SUS430+3 wt. % $CeO_2$+0.5 wt. % $Nb_2O_5$, SUS430+1 wt. % $CeO_2$+1 wt. % $Nb_2O_5$, SUS430+3 wt. % $CeO_2$+1 wt. % $Nb_2O_5$, SUS430+1 wt. % $CeO_2$+2 wt. % $Nb_2O_5$, and SUS430+3 wt. % $CeO_2$+2 wt. % $Nb_2O_5$) were 19.0 $m\Omega.cm^2$, 28.8 $m\Omega.cm^2$, 25.1 $m\Omega.cm^2$, 14.6 $m\Omega.cm^2$, 16.7 $m\Omega.cm^2$, and 36.8 $m\Omega.cm^2$, respectively. This result shows that the value of the ASR increase rate decreases to at least 29.8% to 72.1%. Among various mixing contents, the composition of SUS430+3 wt. % $CeO_2$+2 wt. % $Nb_2O_5$ showed a lower ASR value than the composition of SUS430+1 wt. % $CeO_2$+1 wt. % $Nb_2O_5$ until an oxidation time of 100 hours. However, over time, SUS430+3 wt. % $CeO_2$+2 wt. % $Nb_2O_5$ showed the largest ASR value with the fastest increase rate. ASR Equation below related to the thickness of the oxide is derived from the expression representing the electrical properties of a semiconductor described in the Arrhenius Equation.

$$ASR = \rho X$$

Wherein, $\rho$ represents the electrical resistance and $X$ represents a thickness of the oxide scale. According to the above Equation, the composition with the thickest oxide had a high ASR value in all compositions, but had a lower ASR value than that of the composition without adding a metal oxide. In addition, the formed oxide scale formed an Mn—Cr spinel structure with relatively high electrical conductivity to lower the ASR value. The composition of SUS430+3 wt. % $CeO_2$+1 wt. % $Nb_2O_5$ showed the lowest initial ASR value, the final ASR value, and the ASR increase rate.

Parts (c) and (d) of FIG. 9 show graphs of final ASR values (ASR values after 1000 hours of oxidation) and oxide scale thicknesses (thicknesses measured after 1000 hours of oxidation) of specimens with different added metal oxide contents. The thickness trend of the formed oxide scale is consistent with the trend of the final ASR value. That is, the final ASR value tends to increase in proportion to the oxide scale thickness, and this result follows Equation described above. According to the result, the final ASR value of the composition of SUS430+3 wt. % $CeO_2$+1 wt. % $Nb_2O_5$ was the lowest. This is because the addition oxide is located at the grain boundary and in the bulk and blocks cations (Mn, Cr, etc.) from being diffused from the substrate to the oxide scale, thereby delaying the oxide formation. However, when 1 wt. % or more of $Nb_2O_5$ is added, the laves phase is sufficiently formed on the specimen, and then the remaining Nb element is diffused out of the substrate to form more oxide scales.

The method steps, processes, and operations described herein are not to be construed as necessarily requiring their performance in the particular order discussed or illustrated, unless specifically identified as an order of performance. It is also to be understood that additional or alternative steps may be employed. It will of course be realized that while the foregoing has been given by way of illustrative example of this disclosure, all such and other modifications and variations thereto as would be apparent to those skilled in the art are deemed to fall within the broad scope and ambit of this disclosure as is herein set forth.

While the invention has been explained in relation to its embodiments, it is to be understood that various modifications thereof will become apparent to those skilled in the art upon reading the specification. Therefore, it is to be understood that the invention disclosed herein is intended to cover such modifications as fall within the scope of the appended claims.

The present disclosure described as above is not limited by the aspects described herein and accompanying drawings. It should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

What is claimed is:

1. An interconnect for a solid oxide fuel cell comprising ferritic stainless steel dispersed with nano-$CeO_2$ and $Nb_2O_5$, wherein a particle size of the nano-$CeO_2$ is 20 nm or less, wherein a particle size of the $Nb_2O_5$ is 45 μm or less, wherein a composition of the ferritic stainless steel is as follows:

| Steel alloy | Element Composition (wt. %) | | | | | | |
|---|---|---|---|---|---|---|---|
| | Fe | Cr | O | S | N | C | Si | Mn |
| | Balance | 16.85 | 0.054 | 0.003 | 0.13 | 0.02 | 0.5 | 0.62 | and wherein a content of the nano-$CeO_2$ is 3 wt. % and a content of the $Nb_2O_5$ is 1 wt. %;
wherein said ferritic stainless steel is made by the following process:
obtaining alloy powder slurry by mixing nano-$CeO_2$ powder and $Nb_2O_5$ powder with ferritic stainless steel powder and then using a high energy ball milling (HEBM) process of the mixed powder;
drying the slurry;
grinding and sieving the dried mixed powder;
pelletizing the ground and sieved powder by a uni-axial press;
obtaining a molded body by cold-isostatic pressing the pellets; and
obtaining an alloy-sintered body by sintering the molded body;
wherein the alloy-sintered body is said ferritic stainless steel; and
wherein in the alloy-sintered body, nano-$CeO_2$ and $Nb_2O_5$ have a uniform distribution and form a microstructure.

2. The interconnect for the solid oxide fuel cell of claim 1, wherein the interconnect forms a laves phase ($Fe_2Nb$) under fuel cell operating conditions.

3. A solid oxide fuel cell comprising the interconnect for the solid oxide fuel cell of claim 1.

4. A manufacturing method of an interconnect for a solid oxide fuel cell comprising steps of:
obtaining alloy powder slurry by mixing nano-$CeO_2$ powder and $Nb_2O_5$ powder with ferritic stainless steel powder and then using a high energy ball milling (HEBM) process of the mixed powder;
drying the slurry;
grinding and sieving the dried mixed powder;
pelletizing the ground and sieved powder by a uni-axial press;
obtaining a molded body by cold-isostatic pressing the pellets; and
obtaining an alloy-sintered body by sintering the molded body,
wherein in the alloy-sintered body, nano-$CeO_2$ and $Nb_2O_5$ have a uniform distribution and form a microstructure,
wherein a particle size of the nano-$CeO_2$ is 20 nm or less,
wherein a particle size of the $Nb_2O_5$ is 45 μm or less,
wherein a composition of the ferritic stainless steel is as follows:

| Steel alloy | Element Composition (wt. %) | | | | | | |
|---|---|---|---|---|---|---|---|
| | Fe | Cr | O | S | N | C | Si | Mn |
| | Balance | 16.85 | 0.054 | 0.003 | 0.13 | 0.02 | 0.5 | 0.62 | and wherein a content of the nano-$CeO_2$ is 3 wt. % and a content of the $Nb_2O_5$ is 1 wt. %.

5. The manufacturing method of the interconnect for the solid oxide fuel cell of claim 4, wherein a particle size of the ferritic stainless steel powder is 10 to 50 μm.

6. The manufacturing method of the interconnect for the solid oxide fuel cell of claim 4, wherein the high energy ball milling is performed at a rate of 200 rpm to 300 rpm.

* * * * *